United States Patent
Polidi

(10) Patent No.: US 6,600,994 B1
(45) Date of Patent: Jul. 29, 2003

(54) QUICK SELECTION OF DESTINATIONS IN AN AUTOMOBILE NAVIGATION SYSTEM

(75) Inventor: Ari I. Polidi, Mountain View, CA (US)

(73) Assignee: Horizon Navigation, Inc., Santa Clara, CA (US)

( * ) Notice: Subject to any disclaimer, the term of this patent is extended or adjusted under 35 U.S.C. 154(b) by 79 days.

(21) Appl. No.: 09/861,406

(22) Filed: May 17, 2001

(51) Int. Cl.[7] .............................................. G01C 21/34
(52) U.S. Cl. .................................... 701/209; 340/990
(58) Field of Search ................................ 701/207, 208, 701/209, 210, 211; 340/988, 990, 995

(56) References Cited

U.S. PATENT DOCUMENTS

| 5,359,527 A | * 10/1994 | Takanabe et al. ........... 340/995 |
| 5,398,186 A | 3/1995 | Nakhla |
| 5,652,706 A | 7/1997 | Morimoto et al. |
| 5,680,312 A | * 10/1997 | Oshizawa et al. .......... 701/202 |
| 5,689,252 A | 11/1997 | Ayanoglu et al. |
| 5,696,502 A | 12/1997 | Busch et al. |
| 5,712,632 A | 1/1998 | Nishimura et al. |
| 5,748,107 A | 5/1998 | Kersken et al. |
| 5,784,059 A | * 7/1998 | Morimoto et al. .......... 701/209 |
| 5,819,200 A | * 10/1998 | Tamai et al. ................ 701/208 |
| 5,832,408 A | * 11/1998 | Tamai et al. ................ 701/208 |
| 5,839,088 A | 11/1998 | Hancock et al. |
| 5,842,142 A | 11/1998 | Murray et al. |
| 5,874,905 A | 2/1999 | Nanba et al. |
| 5,919,246 A | 7/1999 | Waizmann et al. |
| 5,933,100 A | 8/1999 | Golding |
| 5,936,631 A | 8/1999 | Yano et al. |
| 5,964,821 A | * 10/1999 | Brunts et al. .............. 701/209 |
| 5,991,690 A | 11/1999 | Murphy |
| 6,028,553 A | 2/2000 | Oberstein |
| 6,088,648 A | 7/2000 | Shah et al. |
| 6,144,919 A | * 11/2000 | Ceylan et al. ............... 701/208 |
| 6,385,535 B2 | * 5/2002 | Ohishi et al. ............... 701/209 |
| 6,429,813 B2 | * 8/2002 | Feigen ........................ 701/208 |
| 6,430,500 B1 | * 8/2002 | Kubota et al. .............. 701/209 |
| 2002/0082771 A1 | * 6/2002 | Anderson .................... 701/209 |

FOREIGN PATENT DOCUMENTS

| DE | 19535576 A1 | 4/1996 |
| EP | 0697686 A2 | 2/1996 |

OTHER PUBLICATIONS

Michael Coates, "Buick Car to Aid Advent of Smart Highways", Buick Communications, Mar. 16, 1997, vol. 3, San Antonio.

Michael W. Rice, "NAVMATE Driver Information and Navigation System", ZEXTEL USA Corporation, Farmington Hills.

B. Taylor, "Travlers First", Traffic Technology International, Issue No. 9, Publication Year 1997 (abstract only).

Timothy Ncguckin, Going smart (intelligent transportation systems) vol. 63, n7, Jul. 1997 (abstract only).

* cited by examiner

Primary Examiner—Gary Chin
(74) Attorney, Agent, or Firm—Blakely, Sokoloff, Taylor & Zafman LLP

(57) ABSTRACT

An automobile navigation system which allows quick selection of destinations by users is described herein. The system maintains a record of destinations selected by each of multiple users of the system. For each user, the system determines a set of destinations most-commonly selected by the user, based on the record of selected destinations. The system determines which of the users is the current user, and in response to receiving a predetermined input, displays a list of destinations corresponding to the most-commonly selected destinations for the current user. When an input selecting one of the displayed destinations is received, the system computes a route to the selected destination.

39 Claims, 4 Drawing Sheets

QUICK SELECTION OF DESTINATIONS IN AN AUTOMOBILE NAVIGATION SYSTEM

FIELD OF THE INVENTION

The present invention pertains to automobile navigation systems. More particularly, the present invention relates to a method and apparatus for allowing quick selection of destinations by users of an automobile navigation system.

BACKGROUND OF THE INVENTION

Current automotive technology includes on-board navigation systems that are designed to assist the driver of an automobile in reaching a desired destination. One type on-board automobile navigation system allows the driver to input a destination, computes a best route to the destination based on a stored street map database, and then provides step-by-step route guidance instructions as the vehicle travels, to guide the driver to the destination. The instructions may be given in the form of text, graphics, recorded or synthesized speech, or a combination thereof. The system may also provide the driver with a visual street map display based on the stored map database and indicate the position and movement of the vehicle as the vehicle travels. The navigation system may use any of various techniques to determine the position of the vehicle as the vehicle travels, such as dead-reckoning in combination with map matching, which may also be used in conjunction with a precise positioning system, such as Global Positioning System (GPS) or the like. On-board navigation systems having features such as these are designed by Visteon Technologies LLC of Sunnyvale, Calif.

Many users and potential users of automobile navigation systems are not very technology-savvy, or they simply are unwilling to spend more than a few seconds interacting with the system on any given trip. Many users become frustrated or annoyed if they are required to carry out more than two or three simple input actions before receiving route guidance from the system. Consequently, it is desirable to provide automobile navigation systems as simple and easy to use as possible, and require very few input actions from the user.

SUMMARY OF THE INVENTION

The present invention includes a method and apparatus for operating an automobile navigation system. A record is maintained of destinations selected by each of multiple users of the system. For each of the users, a set of destinations most-commonly selected by the user is determined, based on the record of selected destinations. A determination is made as to which of the users is the current user of the system, and in response to receiving first predetermined input from the current user, a list of destinations is displayed corresponding to the most-commonly selected destinations associated with the current user. A second input is received from the current user selecting one of the displayed destinations, and a route is computed to the selected destination.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
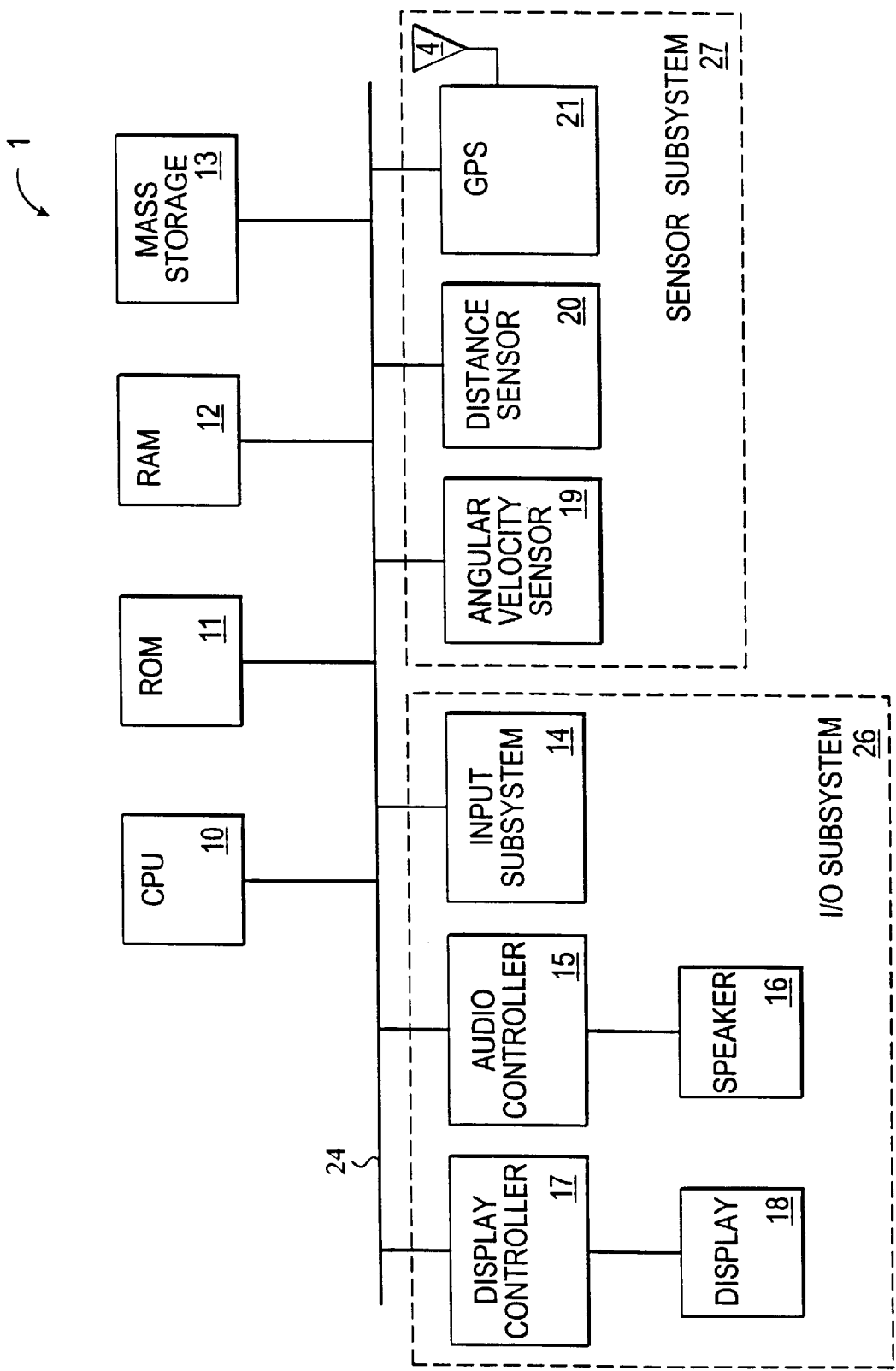
FIG. 1 is a block diagram of an automobile navigation system in which the present invention can be implemented.

An automobile navigation system which allows quick selection of destinations by users is described. Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art. Thus, the present invention can include any variety of combinations and/or integrations of the embodiments described herein.

As noted above, many users and potential users of automobile navigation systems are not very technology-savvy, or are unwilling to spend more than a few seconds interacting with the system on any given trip. Consequently, it is desirable to make automobile navigation systems as simple and easy to use as possible, and to require very few input actions from the user. One activity which it is particularly desirable to simplify is the selection of a destination for purposes of computing a route.

Hence, described herein is automobile navigation system which allows quick selection of destinations by users. As described further below, the system maintains a database of destinations selected by each of multiple users and records the frequency with which each destination is selected by each user. Each driver may have a different set of most-commonly selected destinations. The database may be updated to include a timestamp indicating the day of the week and/or the time of day each time a particular destination is selected by a user. For each user, the system determines a set of destinations most-commonly selected by the user, based on the database of selected destinations. For each user, the set of most-commonly selected destinations may include both specific destinations (e.g., a specific street address) and categories of destinations (e.g., restaurants).

The system also determines which of the users is the current user prior to a user's selection of a destination. In response to receiving a predetermined input, such as the pressing of a so-called "Quick" button, the system then displays some or all of the set of most-commonly selected destinations previously-determined for the current user. The determination of which destinations to display can be made, at least in part, by comparing the current day and/or time with the previously-recorded days and/or times for each destination in the database, and selecting for display those destinations that match most closely for this criterion (i.e., the destinations that were historically selected by the current user at days/times close to the current day/time). The displayed destinations may also be selected by only displaying those destinations in the set which are within a predetermined distance from the automobile's current position. Further, the system may limit the number of displayed destinations to some predetermined number. Subsequently, when an input selecting one of the displayed destinations is received, the system computes a route to the selected destination.

The determination of which user is the current user may be implemented in any of a variety of ways. For example, the system might initially determine the current user by selecting a default user. In one embodiment the system further includes a button or other similar input device, which allows user input to toggle between two or more users (e.g., a to toggle between "Driver A" and "Driver B"), or to select from a list previously-established users, etc. In a more sophisticated embodiment, the system determines the current user based on information received from a separate, independent subsystem of the automobile, without any explicit input from the user in that regard. For example, the system can receive one or more external data signals indicating the current position of the driver's seat and/or the steering wheel or the amount of weight on the driver seat, then compare the data in those signals to stored user preferences, and then identify the user on a closest match basis. The system may alternatively receive the data from a so-called "smart" ignition key, which contains electronic circuitry that stores a user identity and/or user preferences; smart keys such as this are currently used in a growing number of automobile models. Hence, the system can determine the current user based on an explicit user identification from the user, or from a separate, independent subsystem of the automobile, or it can use its own logic to identify the current user, based on data received from sources such as these.

The system further allows each user to add specific destinations or destination categories by, for example, selecting from a previously-stored list or inputting a destination and its address from scratch.

Thus, the system described herein simplifies and speeds up the process of destination selection, thereby making the system more user-friendly than certain prior art automobile navigation systems.

FIG. 1 is a block diagram of one embodiment of an automobile navigation system, in which the aforementioned technique can be implemented. As shown, the navigation system 1 includes a central processing unit (CPU) 10, read-only memory (ROM) 11, random access memory (RAM) 12, and a mass storage device 13, coupled together by a bus system 24. The bus system 24 may represent multiple buses, which may be interconnected by various bridges, bus controllers, and/or adapters. The CPU 10 controls operation of the navigation system 1 by executing instructions stored in either ROM 11, RAM 12, mass storage device 13, or a combination of these devices. Hence, the CPU 10 may be or may include any one or more device such as: a general- or special-purpose programmable microprocessor, digital signal processor (DSP), application-specific integrated circuit (ASIC), programmable logic device (PLD), or a combination thereof. Mass storage device 13 stores a map database of streets and points of interest for a given geographic area. ROM 11 is non-volatile memory, a portion of which may be erasable and reprogrammable. For example, ROM 11 may include flash memory, electrically-erasable programmable ROM (EEPROM), or any other suitable form of programmable-erasable non-volatile memory. Mass storage device 13 may be embodied as a magnetic, optical, magneto-optical, or any other type of non-volatile storage device suitable for storing relatively large volumes of data (e.g., a map database).

The navigation system 1 also includes a sensor subsystem 27. The sensor subsystem includes an angular velocity sensor (e.g., a gyroscope)19, a distance sensor (e.g., odometer) 20, a GPS receiver 21, each coupled to the bus system 24. Note that the GPS receiver 21 may be replaced by appropriate components for use with other types of precise positioning systems, such as LORAN-C, etc., or it may be omitted. Each of the sensors 19–21 may be coupled to the bus system 24 by appropriate interface circuitry, such as analog-to-digital converters and appropriate signal conditioning circuitry. Data output by the angular velocity sensor 19, the distance sensor 20, and GPS receiver 21 are used by the navigation system 1 in conjunction with the street map database to compute the current location of the vehicle as the vehicle travels.

The navigation system 1 also includes an input/output (I/O) subsystem 26. The I/O subsystem 26 includes an input subsystem 14, an audio controller 15, and a display controller 17, each coupled to the bus system 24. The I/O subsystem 26 further includes an audio speaker 16 coupled to and controlled by audio controller 15 and a display device 18 coupled to and controlled by display controller 17. The input subsystem 14 includes various user-operable controls (e.g., buttons, switches, touch-sensitive screen, or a combination thereof), using which the driver can operate the navigation system 1, such as to enter a destination, select a display mode, etc. The navigation system 1 outputs digitized or synthesized audio navigation instructions to the user via the audio speaker 16. The system 1 provides visual output, which may include a map display and/or navigation instructions, to the driver via the display device 18. The display device 18 may be a liquid crystal display (LCD), a cathode ray tube (CRT), or any other suitable form of display device.

Note that aspects of the present invention may be embodied in software, as will be apparent from this description. That is, aspects of the present invention may be carried out in a processing system, such as navigation system 1, in response to its CPU executing sequences of instructions contained in memory. The instructions may be executed from RAM, ROM, a mass storage device, or a combination of such devices. Also, in various embodiments of the present invention, hardwired circuitry may be used in place of, or in combination with, software instructions to implement the present invention. Thus, the present invention is not limited to any specific combination of hardware circuitry and software, nor to any particular source for the instructions executed by a computer system.

Note that some embodiments of the navigation system 1 may not include all of the above-mentioned components, and some may include additional components not shown.

Figure 2:
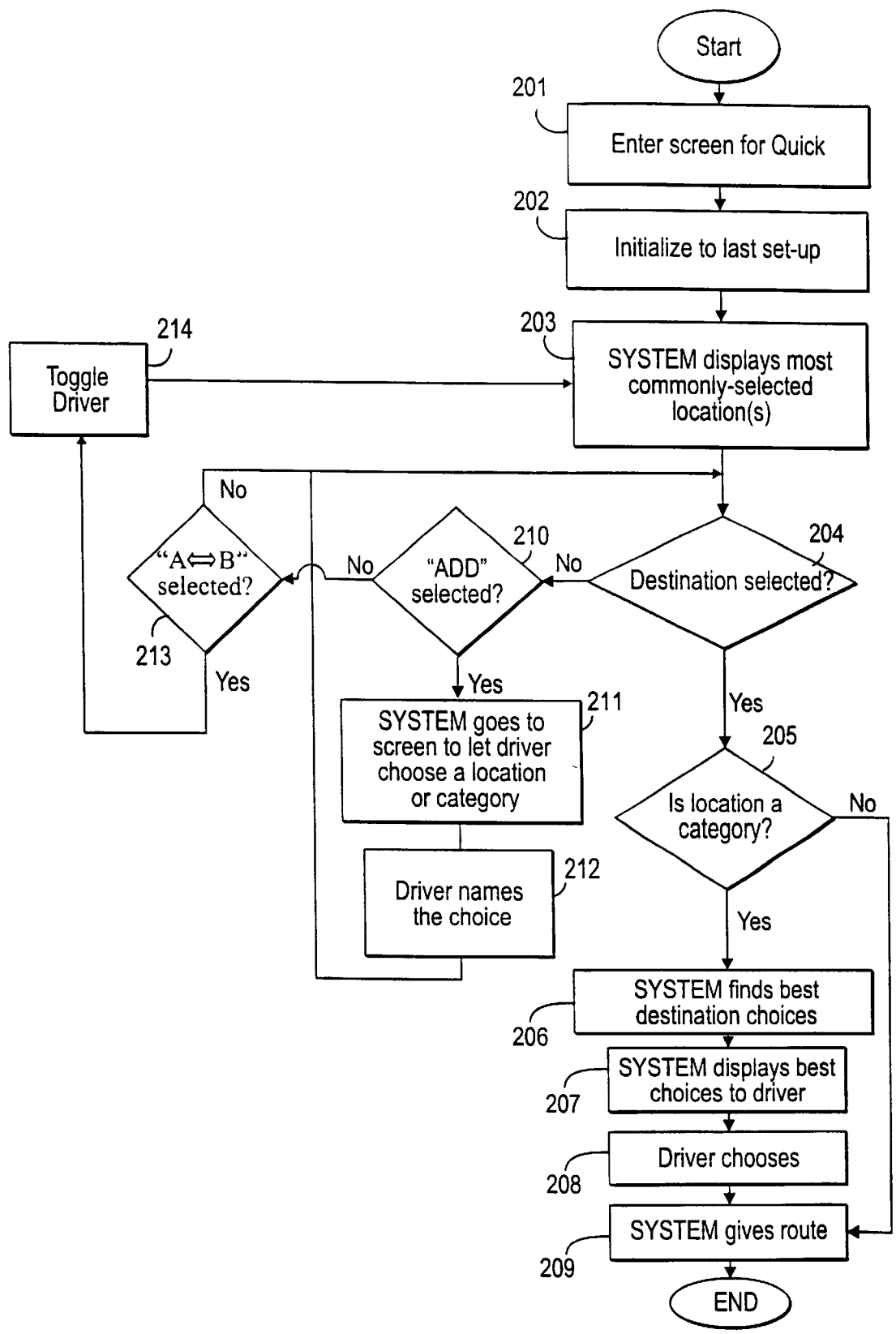
FIG. 2 is a flow diagram showing a process performed by the automobile navigation system, in accordance with an embodiment of the present invention.

FIG. 2 is a flow diagram showing a process performed by the automobile navigation system according to one embodiment. This process will be explained below with reference to FIGS. 3A through 3D. It is informative to refer first to FIG. 3A, which conceptually shows the user interface 30 of the automobile navigation system, according to one embodiment. As shown, the user interface includes a displayed screen image 31 (which may be presented by a device such as display 18 in FIG. 1), and a number of physical buttons 36 through 39. The screen image 31 includes several soft buttons (images) 32 through 35, each of which corresponds to a different one of physical buttons 36 through 39. The particular function of each physical button depends on what is currently displayed in its corresponding soft button, which in turn depends on the current operational mode of the system. The current function of a physical button is indicated in the corresponding soft button; to activate that function, the user presses the physical button.

Figure 3A:
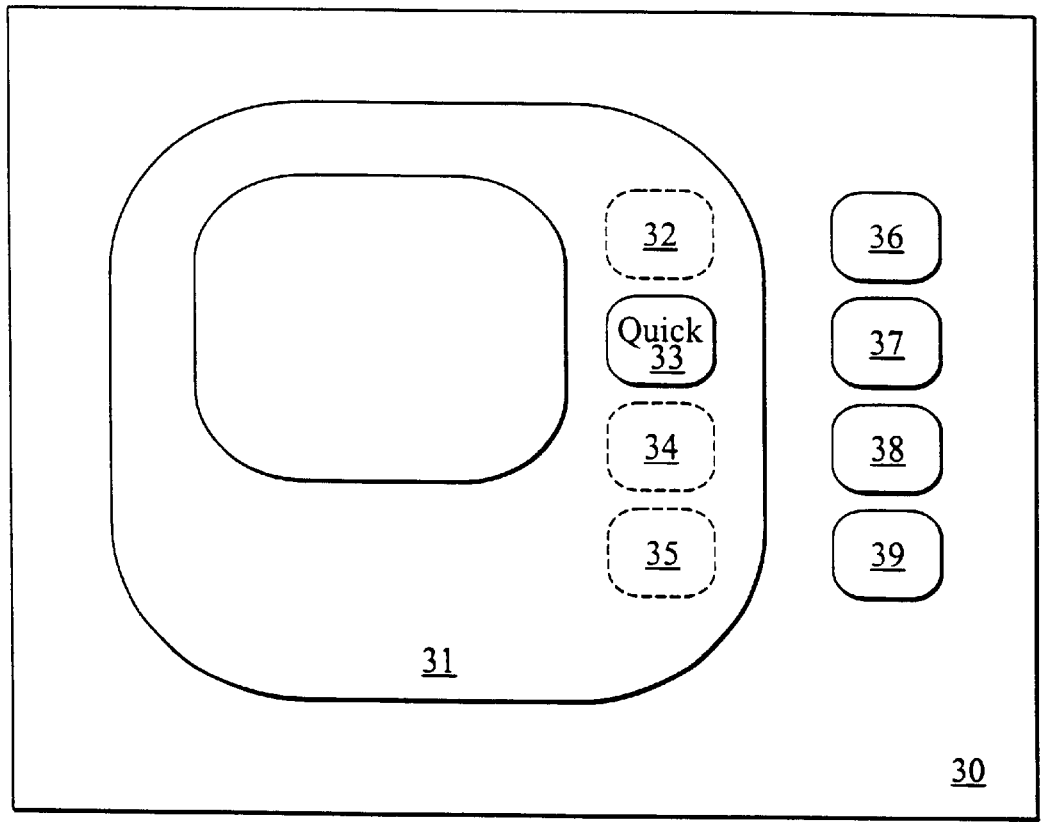
FIGS. 3A through 3D show the user interface of the navigation system, in accordance with an embodiment of the present invention.
Figure 3B:
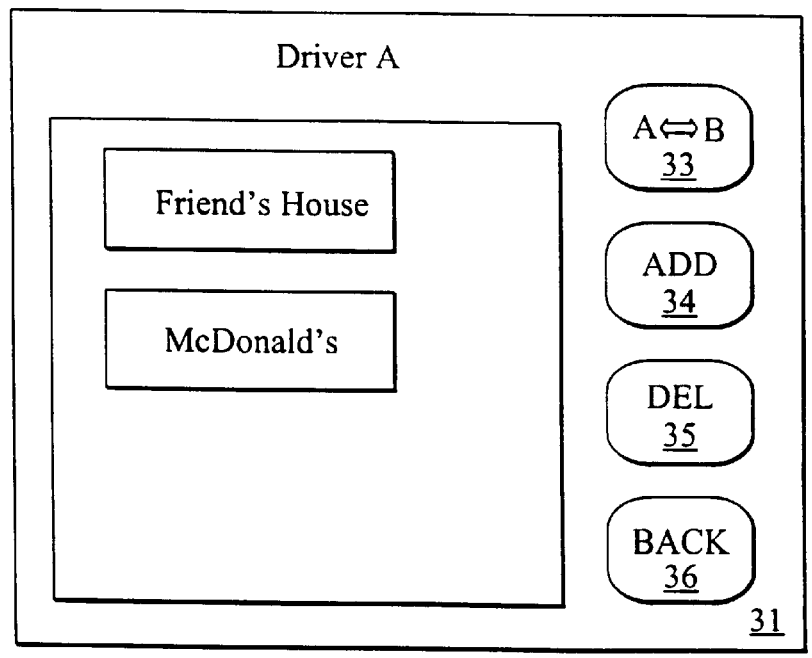
Figure 3C:
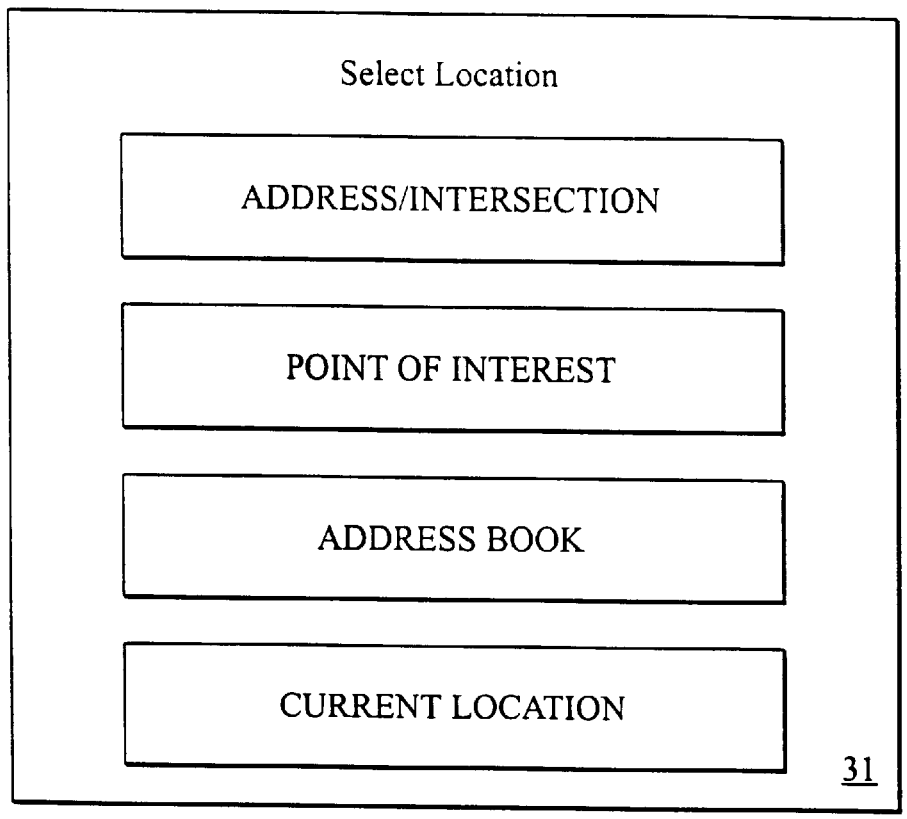
Figure 3D:
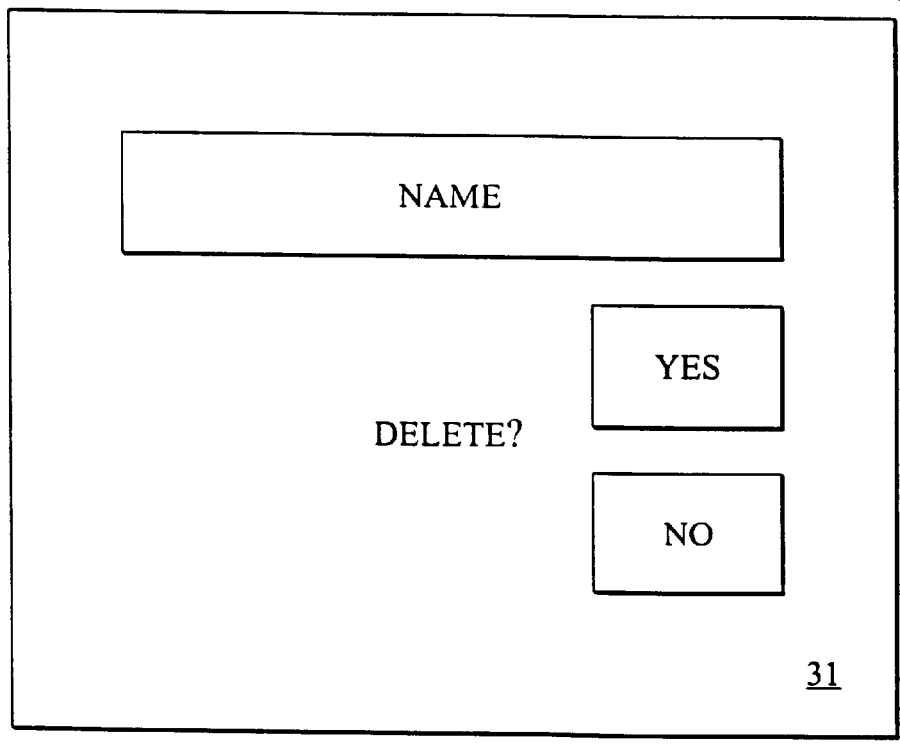

As shown in FIG. 3A, in one operational mode prior to selection of a destination, soft key 33 is assigned as a "Quick" button, which functions in the manner described above. Specifically, the user presses the Quick button 33 to cause the system to display a user-specific screen for quick selection of a destination, shown in FIG. 3B. The physical buttons 36 through 39 are not shown in FIGS. 3B through 3D, to simplify description. As shown in FIG. 3B, the displayed destinations include at least some of the previously-determined set of commonly-selected destinations for the current user. The displayed destinations may include specific destinations (e.g., "Friend's Home") or destination categories (e.g., McDonald's). In this mode, soft button 32 is configured to allow the user to toggle between two users, Driver A and Driver B. The quick screen displayed in FIG. 3B is for Driver A. Note that in other embodiments, potentially any number of users can be serviced by the system. "BACK" button 35 in FIG. 3B can be used to take the user back to the previous screen.

Soft buttons 33 and 34 in FIG. 3B allow the user to add or delete, respectively, destinations from his set of commonly-selected destinations. Specifically, pressing the ADD button 33 takes the user to the screen shown in FIG. 3C, where the user can specify a destination to be added. Pressing the DEL (delete) button 34 takes the user to the screen shown in FIG. 3D, where the user can name a destination to be deleted. In one embodiment, these buttons may also be used to add or delete a user from the system.

Refer now to FIG. 2. Initially, at block 201 the user presses the Quick button 33 (FIG. 3A) to access the quick destinations screen, an example of which is shown in FIG. 3B. In response to the input at block 201, the system loads the set of most commonly-selected destinations for the current user at block 202. The determination of the current user may be done by any suitable technique, such as any of the techniques described above. The determination of the current user may occur in response to the user pressing the Quick button. Alternatively, the determination may occur before the user presses the Quick button, such as when the system is powered up, periodically, or at specified times.

At block 203 the system displays at least some of the set of most commonly-selected destinations for the current user. If a destination is selected at block 204, and the destination is not a category at block 205, then the selected destination is a specific destination; in that case the system computes a route from the current position of the automobile to the selected destination at block 209. If the selected destination is a category at block 205, then at block 206 the system finds the "best" destination choices within that category (based for example, on frequency of selection, timestamps, and distance from the current position of the automobile). At block 207, the system displays to the user the best destination choices for that user. The driver selects one of the displayed destinations at block 208, and at block 209 the system computes a route from the current position of the automobile to the selected destination.

If a destination was not selected at block 204, and if "ADD" was selected (button 33 in FIG. 3B), then at block 211 the system displays a screen to let the user choose either a specific destination or a category, such as shown in FIG. 3B. The user makes the selection at block 212, and the process then continues from block 204. If neither a destination (block 204) nor "ADD" was selected (block 210), then if the toggle input "A<=>B" was activated at block 213, the system toggles the current driver, and the process continues from block 203. Otherwise, after block 213 the process continues from block 204. As noted above, the system may support essentially any number of users, and the determination of the current user may be made in other ways, such as described above. Note that many variations upon the above-described process are possible, including altering the sequence of operations or adding or deleting certain operations.

Thus, an automobile navigation system which allows quick selection of destinations by users has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. An automobile navigation system comprising:
   a processor;
   an input interface;
   an output device; and
   a storage device coupled to the processor and storing instructions for execution by the processor to configure the navigation system to:
      maintain a database indicating destinations selected by each of a plurality of users of the system, including data indicating a frequency at which each of the destinations is selected by each of the users;
      for each of the plurality of users, determine a set of destinations most-commonly selected by said user, based on the database;
      determine which of the plurality of users is the current user of the system;
      in response to receiving first predetermined input from the current user via the input interface, display a list of destinations corresponding to the set of most-commonly selected destinations associated with the current user;
      receive second input from the current user via the input interface, the second input selecting a displayed one of the commonly selected destinations;
      compute a route to the selected destination; and
      output route guidance information to the current user using the output device based on the computed route.

2. An automobile navigation system as recited in claim 1, wherein said determining which of the plurality of users is the current user comprises selecting a default user.

3. An automobile navigation system as recited in claim 1, wherein said determining which of the plurality of users is the current user comprises receiving a user input selecting one of the plurality of users.

4. An automobile navigation system as recited in claim 3, wherein the input interface comprises an input device to sequentially select from among the plurality of users when activated.

5. An automobile navigation system as recited in claim 4, wherein the input device comprises a toggle button.

6. An automobile navigation system as recited in claim 4, wherein the input interface further comprises a pre-assigned button to receive the first predetermined input.

7. An automobile navigation system as recited in claim 1, wherein said determining which of the plurality of users is the current user comprises automatically determining which of the plurality of users is the current user of the system based on any one or more of the following:
   an indication of a current position of a driver's seat of the automobile;
   an indication of a current position of a steering wheel of the automobile; or an indication, from a separate subsystem of the automobile, of which user is the driver of the automobile.

8. An automobile navigation system as recited in claim 1, wherein:
said maintaining a record of destinations selected by each of the plurality of users comprises recording the times of day the destinations are selected by each user; and
said displaying a list of destinations representing the set of most-commonly selected destinations is further based on the time of day when the first predetermined input is received and the recorded times of day.

9. An automobile navigation system as recited in claim 1, wherein for each user, the set of most-commonly selected destinations comprises both categories of destinations and specific destinations.

10. An automobile navigation system as recited in claim 1, wherein the instructions further configure the system to allow each user to add destinations to the set of destinations most commonly selected by each said user.

11. An automobile navigation system comprising:
means for maintaining a record of destinations selected by each of a plurality of users of the system and the times of day the destinations are selected by each user;
means for determining, for each of the plurality of users, a set of destinations most-commonly selected by said user, based on the record of selected destinations, wherein for each user, the set of most-commonly selected destinations comprises both categories of destinations and specific destinations;
means for determining which of the plurality of users is the current user of the system;
means for displaying a list of destinations corresponding to the set of most-commonly selected destinations associated with the current user, in response to receiving first predetermined input from the current user, based on the time of day when the first predetermined input is received and the recorded times of day;
means for receiving second input from the current user selecting a displayed one of the commonly selected destinations; and
means for computing a route to the selected destination.

12. An automobile navigation system as recited in claim 11, wherein said means for determining which of the plurality of users is the current user comprises means for selecting a default user.

13. An automobile navigation system as recited in claim 11, wherein said means for determining which of the plurality of users is the current user comprises means for receiving a user input selecting one of the plurality of users.

14. An automobile navigation system as recited in claim 11, wherein the means for determining which of the plurality of users is the current user of the system comprises an input device to sequentially select from among the plurality of users when activated.

15. An automobile navigation system as recited in claim 14, wherein the input device comprises a toggle button.

16. An automobile navigation system as recited in claim 15, wherein the input interface further comprises a preassigned button to receive the first predetermined input.

17. An automobile navigation system as recited in claim 11, wherein said means for determining which of the plurality of users is the current user comprises means for automatically determining which of the plurality of users is the current user of the system based on any one or more of the following:

an indication of a current position of a driver's seat of the automobile;
an indication of a current position of a steering wheel of the automobile; or
an indication, from a separate subsystem of the automobile, of which user is the driver of the automobile.

18. An automobile navigation system as recited in claim 11, further comprising means for allowing each user to add destinations to the set of destinations most commonly selected by each said user.

19. A method of operating an automobile navigation system in an automobile, the method comprising:
maintaining a record of destinations selected, for purposes of requesting route guidance from the system, by each of a plurality of users of the system;
for each user of the plurality of users, determining a set of destinations most-commonly selected by said user during prior instances of said user requesting route guidance from the system, based on the record of selected destinations;
determining which of the plurality of users is the current user of the system;
in response to receiving first predetermined input from the current user, displaying a list of destinations corresponding to the set of most-commonly selected destinations associated with the current user;
receiving second input from the current user selecting a displayed one of the commonly selected destinations; and
computing a route to the selected destination.

20. A method as recited in claim 19, wherein said determining which of the plurality of users is the current user comprises selecting a default user.

21. A method as recited in claim 19, wherein said determining which of the plurality of users is the current user comprises receiving a user input selecting one of the plurality of users.

22. A method as recited in claim 19, wherein said determining which of the plurality of users is the current user comprises automatically determining which of the plurality of users is the current user of the system based on any one or more of the following:
an indication of a current position of a driver's seat of the automobile;
an indication of a current position of a steering wheel of the automobile; or
an indication, from a separate subsystem of the automobile, of which user is the driver of the automobile.

23. A method as recited in claim 19, wherein:
said maintaining a record of destinations selected by each of the plurality of users comprises recording the times of day the destinations are selected by each user; and
said displaying a list of destinations representing the set of most-commonly selected destinations is further based on the time of day when the first predetermined input is received and the recorded times of day.

24. A method as recited in claim 19, wherein for each user, the set of most-commonly selected destinations comprises both categories of destinations and specific destinations.

25. A method as recited in claim 19, further comprising allowing each user to add destinations to the set of destinations most commonly selected by each said user.

26. A method of operating an navigation system installed in an automobile, the method comprising:

determining and storing a set of destinations commonly requested by a plurality of users during prior instances of said users requesting route guidance from the navigation system;

enabling each of the plurality of users of the navigation system independently to add destinations to the stored set of commonly requested destinations;

receiving a first user input at a first control of the navigation system, wherein the first control is preassigned for accessing the stored set of commonly requested destinations;

identifying which of the plurality of users is currently using the navigation system;

in response to the first user input generating a list of commonly requested destinations to be output on a display device of the navigation system, according to which of the plurality of users is currently using the navigation system, wherein each of the commonly requested destinations is located within a predetermined distance from a current location of the automobile; and outputting the list of commonly requested destinations on the display device;

receiving a second user input;

when the second user input represents selection of one of the commonly requested destinations, then responding to the second user input by computing a route from the current location of the automobile to the selected destination, and outputting route guidance information for guiding the current user of the navigation system to the selected destination.

27. A method as recited in claim 26, wherein said identifying which of the plurality of users is currently using the navigation system comprises receiving a user input directly at a second control of the navigation system.

28. A method as recited in claim 26, wherein said identifying which of the plurality of users is currently using the navigation system comprises:

receiving input from a subsystem of the automobile that is outside of the navigation system; and using the input to determine which of the plurality of users is currently using the navigation system.

29. A method as recited in claim 28, wherein the subsystem comprises a system for positioning a driver seat of the automobile.

30. A method as recited in claim 28, wherein the subsystem comprises a system for positioning a steering wheel of the automobile.

31. A method as recited in claim 26, wherein said identifying which of the plurality of users is currently using the navigation system comprises sensing an amount of weight on a driver seat of the vehicle.

32. A method as recited in claim 26, wherein said generating the list of commonly requested destinations comprises generating the list of commonly requested destinations based, at least in part, on a history of travel of the automobile.

33. A method as recited in claim 32, further comprising recording the history of travel of the vehicle.

34. A method as recited in claim 32, wherein said generating the list of commonly requested destinations comprises generating the list of commonly requested destinations based, at least in part, on pattern of driving of the current user of the navigation system.

35. A method as recited in claim 34, further comprising generating the list of commonly requested destinations based, at least in part, on a current time of day.

36. A method as recited in claim 34, further comprising recording the pattern of driving of said one of the plurality of users.

37. A method as recited in claim 26, wherein the list further includes one or more categories of commonly requested destinations.

38. A method as recited in claim 37, wherein:

when the second user input represents selection of one of the categories, then identifying and displaying on the display device one or more destinations of the selected category which are located within a predetermined distance from the current location of the automobile, receiving a third user input selecting one of the destinations of the selected category, computing a route from the current location of the automobile to the selected destination of the selected category, and outputting route guidance information for guiding the current user of the navigation system to the selected destination of the selected category.

39. A method as recited in claim 37, further comprising enabling each of a plurality of users of the navigation system independently to add categories to said one or more categories of commonly requested destinations.

* * * * *